Figure 1:
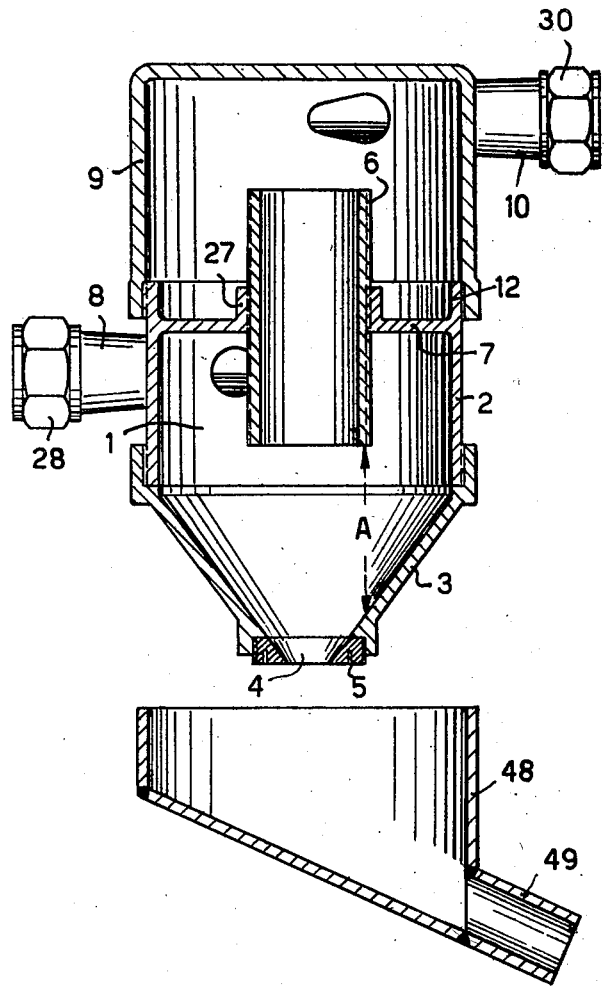

Jan. 14, 1958 F. J. FONTEIN ET AL 2,819,795
PROCESS FOR THE SEPARATION ACCORDING TO SPECIFIC
GRAVITY OF SOLIDS OF DIFFERENT SPECIFIC
GRAVITY AND PARTICLE SIZE
Original Filed May 29, 1951 9 Sheets-Sheet 1

INVENTORS
FREERK J. FONTEIN
CORNELIS DIJKSMAN

BY Cushman, Darby & Cushman
ATTORNEYS

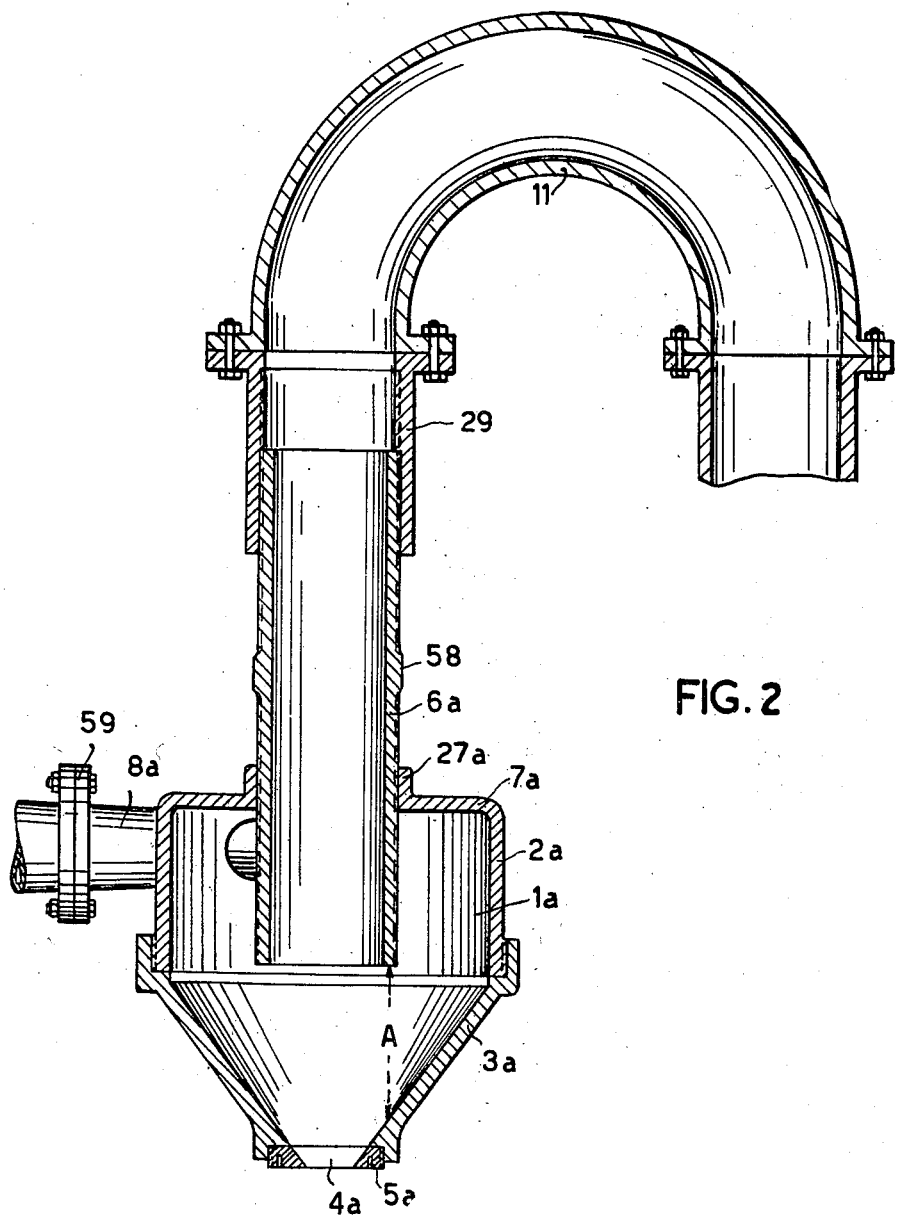

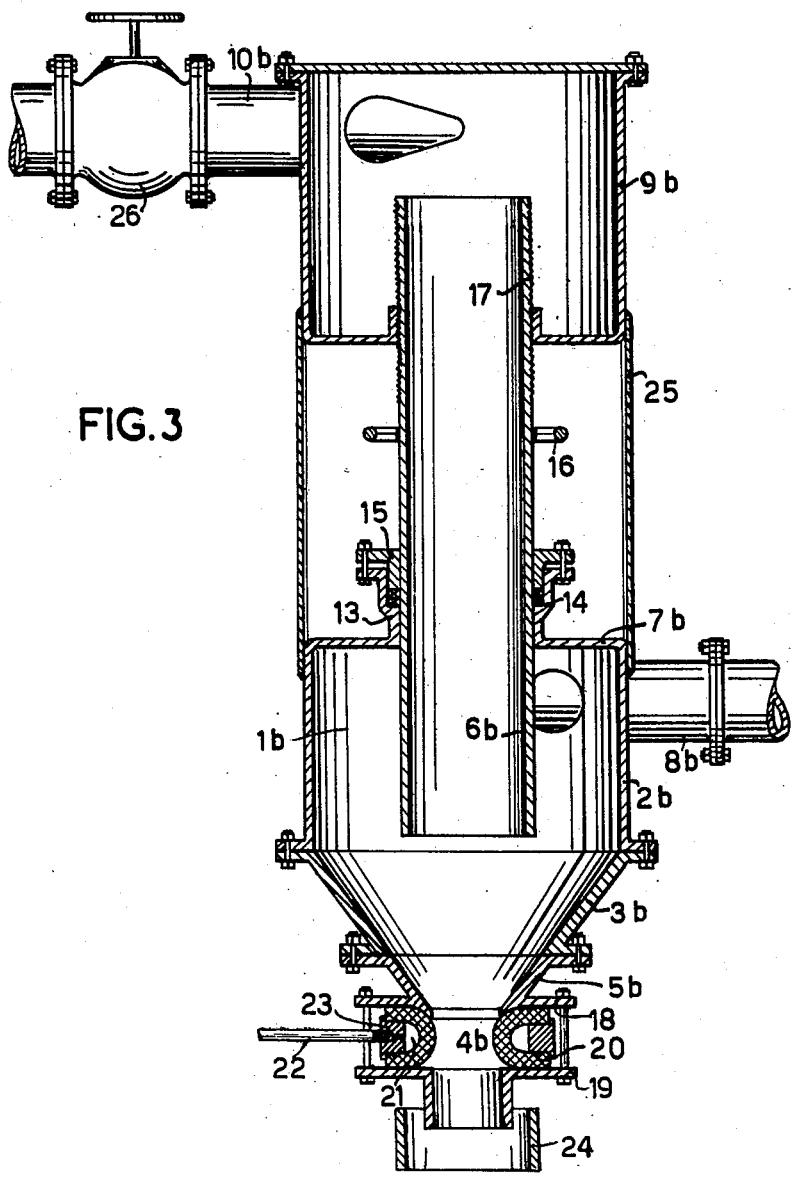

Jan. 14, 1958      F. J. FONTEIN ET AL      2,819,795
PROCESS FOR THE SEPARATION ACCORDING TO SPECIFIC
GRAVITY OF SOLIDS OF DIFFERENT SPECIFIC
GRAVITY AND PARTICLE SIZE
Original Filed May 29, 1951                9 Sheets-Sheet 4

INVENTORS
FREERK J. FONTEIN
CORNELIS DIJKSMAN

BY Cushman, Darby & Cushman
ATTORNEYS

INVENTORS
FREERK J. FONTEIN
CORNELIS DIJKSMAN

ATTORNEYS

Jan. 14, 1958   F. J. FONTEIN ET AL   2,819,795
PROCESS FOR THE SEPARATION ACCORDING TO SPECIFIC
GRAVITY OF SOLIDS OF DIFFERENT SPECIFIC
GRAVITY AND PARTICLE SIZE
Original Filed May 29, 1951   9 Sheets-Sheet 7

INVENTORS
FREERK J. FONTEIN
CORNELIS DIJKSMAN

BY Cushman, Darby & Cushman
ATTORNEYS

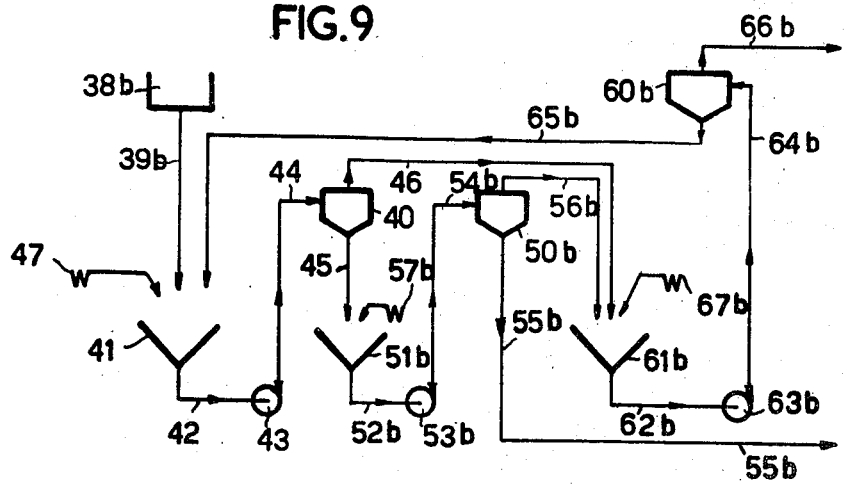
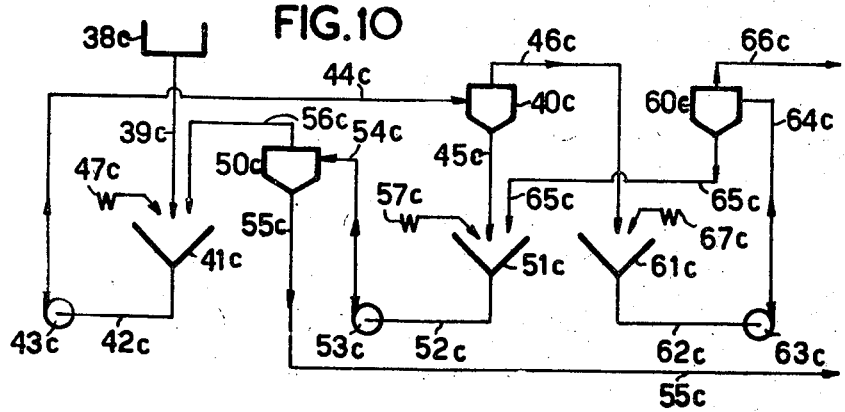
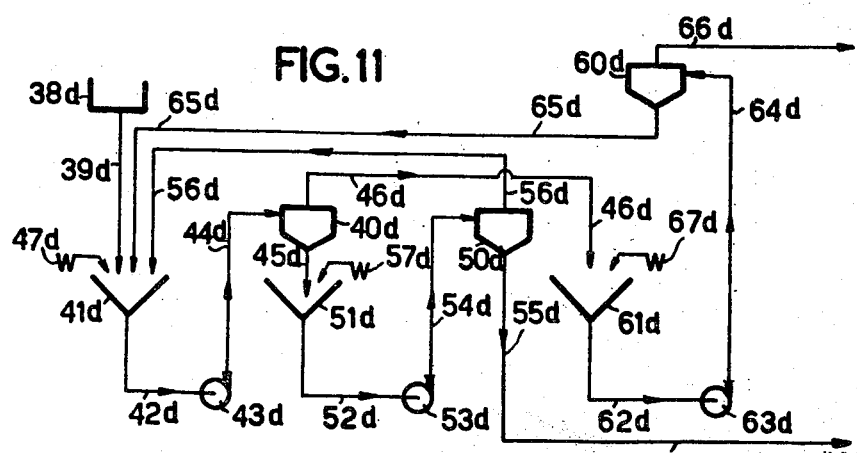

United States Patent Office

2,819,795
Patented Jan. 14, 1958

2,819,795

PROCESS FOR THE SEPARATION ACCORDING TO SPECIFIC GRAVITY OF SOLIDS OF DIFFERENT SPECIFIC GRAVITY AND PARTICLE SIZE

Freerk J. Fontein, Heerlen, and Cornelis Dijksman, Geleen, Netherlands, assignors to Stamicarbon N. V., Heerlen, Netherlands Continuation of abandoned application Serial No. 228,834, May 29, 1951. This application February 25, 1955, Serial No. 490,468

Claims priority, application Netherlands May 30, 1950

6 Claims. (Cl. 209—211)

This invention relates to separation of solids of different specific gravity and particle size into fractions one of which contains substantially only specifically heavy particles, while another fraction contains substantially all specifically light particles. More particularly this invention relates to specific gravity separation effected in hydrocyclones by means of a separating medium.

This application is a continuation of our copending application Serial Number 228,834, filed May 29, 1951, now abandoned.

This invention can be used to advantage in the separation of coal from waste, but also in separating ore from gangue, palmkernels from shells and in separating and concentrating other solids.

This invention is in particular useful in the separation of a mixture of coal and shale particles into a fraction with a low ash content, which fraction mainly consists of coal, and a fraction with a high ash content which latter fraction is chiefly composed of shale particles.

It is well-known that such a separation according to specific gravity can be carried out with the help of liquids having a specific gravity intermediate between the specific gravities of the substances to be separated. If desired, these liquids may be a mixture of liquids or of a solution. It is also customary to raise the specific gravity of a liquid by suspending a finely divided solid substance therein. In actual practice frequent use is made of suspensions of loess, crushed slate, baryta or magnetite in water.

A considerable improvement of this, frequently slowly proceeding, washing process is obtained by applying the so-called hydrocyclones as are described for example in the United States patent specification 2,543,689, in Dutch patent specification 58,691 and in the J. Inst. of Fuel, December 1945, pages 33-47.

These hydrocyclones usually consist of a vessel tapering in one direction and bounded by a closed surface of revolution and being provided at its wider end with one or more feed ducts in tangential relation thereto and with two centrally arranged circular discharge apertures, namely the apex and overflow apertures, the former of which is located in the apex the latter being arranged in the wall opposite said apex. The edge of the overflow aperture may be extended into the vessel and may have the shape of a short tubular member, hereinafter called vortex finder.

If a mixture of particles differing in specific gravity and suspended in a liquid with a specific gravity between those of the particles to be separated, is forced through such a hydrocyclone of suitable shape and dimensions it appears that a separation according to specific gravity is obtained. The liquid leaving through the apex aperture (called apex fraction) contains the components of the higher, the liquid discharged through the overflow aperture (called overflow fraction) the components of the lower specific gravity. When using as a separating liquid a suspension constituted by fine particles of a solid weighting material, such as loess or magnetite in a liquid such as water, it appears that the suspension is also affected by the great centrifugal forces occurring in the hydrocyclone.

In this case a certain thickening effect occurs. The apex fraction becomes relatively richer, the overflow fraction relatively poorer in weighting material. Only in case the carrier suspension is very fine, this thickening effect becomes practically negligible. Under the operating conditions the suspension may then be regarded as stable.

This thickening effect is made use of in practice. If washing in a hydrocyclone is done with the help of non-stable suspensions, the separating density is invariably higher than the specific gravity of the suspension fed into the hydrocyclone but practically equal to the specific gravity of the suspension obtained from the apex fraction, after the particles to be separated have been removed therefrom. A loess suspension having a specific gravity of 1.2 can for instance be applied for washing according to a separating density of 1.5.

Naturally, the specific gravity of the separating suspension cannot be raised at will to the region of that of the weighting material applied, as then the viscosity of the suspension thickened in the hydrocyclone would become too high to obtain a good separating effect.

It has appeared that the highest separating density that can be attained when use is made of non-stable suspensions, is about equal to the specific gravity of a suspension containing 50 percent by volume of weighting material. This then is the concentration of the weighting material in the apex fraction.

The concentration of the feed should remain below the value because otherwise the high viscosity will already have an adverse effect upon the operation of the hydrocyclone. This explains why in the case stable suspensions are used, such a high separating density cannot be attained.

From this it follows that when the carrier liquid has a specific gravity $d_1$ and the weighting material has a specific gravity $d_v$, the highest attainable separating density will be equal to or lower than $$\frac{d_1 + d_v}{2}$$

In the process described in the aforementioned U. S. patent specification No. 2,543,689 washing can therefore not be carried out at a separating density exceeding the values given in the following table:

WATER AS SUSPENSION AGENT

| Weighting material: | Separating density |
|---|---|
| Loess or crushed slate (specific gravity 2.6) | 1.8 |
| Baryta (specific gravity 4.5) | 2.75 |
| Magnetite (specific gravity 4.8) | 2.9 |
| Ferrosilicon (specific gravity 6.8) | 3.9 |
| Galena (specific gravity 7.0) | 4.0 |

So when washing is carried out according to the prior processes no other suspensions can be used but those wherein the specific gravity of the weighting material is considerably higher than the specific gravity of the specifically lighter fraction of the mixture to be separated. In coal washeries where coal (specific gravity 1.3–1.55) is to be separated from shale (specific gravity 1.55–2.6) all the weighting materials mentioned in the above table can be employed. It stands to reason that on account of their low cost loess and crushed slate will be preferred for this purpose. In the washing of fines, however, difficulties are encountered when separating the coal and the fine particles of the weighting material from the resulting coal fraction. Said difficulties may be obviated by employing magnetite as a weighting material.

Owing to the magnetic properties of the magnetite, the separation and the regeneration of the suspension may be carried out without encountering difficulties; on account of this the application of the much more expensive magnetite may be justified economically.

For washing ores, in which the gangue with a specific gravity of 2.6 or upwards is the specifically lighter fraction, magnetite can still just be used in some cases. Mostly, however, the more expensive ferrosilicon or the more difficult to recover galena has to be applied.

A possibility applied in practice is to use the finest fraction of the heavier component of the mixture to be separated as the weighting material. Especially if it is important to separate the heavier component in the purest possible form this variation may be of great advantage. In this case, however, the fraction of lower specific gravity always remains contaminated with the particles of the separating suspension.

In some cases, for instance in the food-stuff industry, all contaminations with weighting materials have to be avoided as much as possible. Washing with a suspension is in this case practically out of the question. The application of a heavy liquid is in many cases too expensive. Besides there is often the disadvantage that the above mentioned liquids are detrimental either to the product or to health.

Thus the use of the prior hydrocyclones of the type referred to is limited to such separations in which it is technically possible to use either a stable separating medium the specific gravity of which equals the separating density or an unstable separating medium which will be densified in the hydrocyclone to such an extent that the specific gravity of this densified medium equals the desired separating density, in which case the viscosity of the densified medium has to be taken into account. In any case the separating density substantially equals the specific gravity of the medium discharged through the apex aperture of the hydrocyclone.

Now it is the major object of this invention to provide a process of operating a hydrocyclone of the type referred to which is adapted to effect a separating density which is significantly in excess of the specific gravity of the medium discharged through the apex aperture of said hydrocyclone.

In some cases the desired separating density will be only slightly higher than a feasible specific gravity of the apex discharge but it may happen that a large gap has to be bridged. Thus it is a further object of this invention that such hydrocyclone be provided with means for the control of the ratio of the separating density and the specific gravity of the medium discharged through the apex aperture. This ratio must be controllable between 1 and approximately 1.6 and even higher.

It is in particular the object of this invention to provide a process for the separation of raw coal into a fraction with a low ash content and a fraction with a high ash content while using water as a separating medium.

It is also an object of this invention to provide a process for the separation of ores from gangue by means of a suspension of gangue in water.

It is another object of this invention to provide a process for the separation of palmkernels from shells by means of water.

Further objects will appear from the examples which are described hereinafter.

In summary, the above, and possibly other objects are attained by a hydrocyclone of the type referred to but whose dimensions differ significantly from those of the prior hydrocyclones. The hydrocyclone according to the invention comprises a vortex chamber including a cylindrical chamber portion and a tapered chamber portion, said portions being coaxial, said tapered chamber portion being circular in transverse section and including a circular and central apex aperture, a tangential feed duct debouching into said cylindrical chamber portion, the inlet mount of the feed pipe being flush with the inner surface of said cylindrical chamber portion, an end wall for said cylindrical chamber portion having a central outlet opening, a tubular member fitted in the outlet opening and extending axially into said vortex chamber. The diameter of said apex aperture is maximally 0.7 time the inner diameter of said tubular member, and, in an axial section of the vortex chamber the angle between the wall of said tapered chamber portion and the line along the inner wall of said tubular member and parallel to the axis of the vortex chamber is at least 25°, and at most 45°. The tapered chamber portion may be conical, in which case half the cone angle of said conical chamber portion is at least 25° and at most 45°.

In the preferred embodiments such hydrocyclones show one or more of the following characteristic features:

(1) The cross sectional area of the feed aperture or, with a hydrocyclone with more than one feed aperture the sum of the cross sectional areas of the feed apertures, is equal to 0.4–0.15 time the cross sectional area of the overflow aperture.

(2) The diameter of the overflow aperture is equal to ⅓ to ½ times the diameter of the cylindrical chamber portion of the hydrocyclone.

(3) The apex aperture of the hydrocyclone is arranged substantially vertically under the overflow aperture and debouches into a receiver which is provided with means to maintain the level of a liquid in said receiver below the apex aperture.

(4) The axial distance from the edge of the vortex finder to the wall of the tapered chamber portion of the hydrocyclone is equal to 4 to 0.3 times the diameter of the vortex finder, this distance preferably being adjustable.

(5) The diameter of the apex aperture is adjustable.

(6) The vortex finder debouches into a closed hood which is provided with a discharge outlet and with means for exerting a controllable back pressure on liquid discharging through said outlet.

A muliplicity of such hydrocyclones, which are identical, may be provided with a common feed chamber in feeding relation to the feed ducts of such hydrocyclones and with a common overflow chamber in receiving relation to the vortex finders. Such a multiplicity is called a multiple hydrocyclone.

First and second hydrocyclones or multiple hydrocyclones may be arranged in series in such a manner that a fraction discharged from a first hydrocyclone is fed into a second hydrocyclone which is adapted to effect a separation to another separating density than the separating density effected in said first hydrocyclone. For that purpose the lengths of the vortex finders or the diameters of the apex apertures or the back pressures or a combination of these features will be different for the first and second hydrocyclones. If the apex discharge of a first hydrocyclone is fed into a second hydrocyclone, there will be means to supply more separating medium to the apex fraction of the first hydrocyclone.

The process according to the invention is characterized in that the washing liquid used consists of a liquid or of a suspension having a specific gravity lower than the separating density, said suspension being of such a nature that, under the influence of the forces occurring in the hydrocyclones the suspension is not thickened to such a degree that the specific gravity of the apex fraction does becomes equal to the separating density, while the hydrocyclones used are hydrocyclones or combinations of hydrocyclones as described above.

A special mode of performing the process consists of washing with a true liquid, such as water, having a specific gravity lower than that of the particles to be separated and to the washing of mixtures in which processes the weighting material used in the washing liquid consists of a finely divided fraction of the specifically lightest particles of the mixture to be separated.

We thus have found a new process with which it is possible to separate mixtures of particles differing in specific gravity and in grain-size in a hydrocyclone at considerably higher separating densities than has up to now been possible, namely at a separating density higher than the specific gravity of the washing liquid, or, in case use is made of a not quite stable suspension, at a separating density higher than the specific gravity of the thickened suspension that is obtained from the apex fraction.

In order to understand the essence of the invention, it is necessary to go somewhat further into the phenomena in the hydrocyclone.

In accordance with what has been said in the introduction the term hydrocyclone as used herein refers to a vessel enclosed by a smooth and closed surface of revolution which tapers in one direction and at the wider end is provided with one or more tangential feed ducts for continuously supplying the liquid under pressure while at the apex and in the side opposite said apex said vessel is provided with a centrally arranged discharge aperture (said apertures being called apex aperture and overflow aperture) respectively, the latter of which is provided with a tubular member, called vortex finder, which extends into the inside of the hydrocyclone. The fraction discharging through the apex aperture is called apex fraction, the fraction leaving through the vortex finder being termed overflow fraction.

When a liquid is supplied under pressure into such a hydrocyclone, a rapidly rotating current is formed in the hydrocyclone. When the apex aperture is small as compared with the overflow aperture substantially all liquid will discharge through the overflow aperture. Along the side walls of the hydrocyclone a strong liquid vortex is formed which is directed towards the apex of the hydrocyclone. Near the apex the rotating liquid current turns inward towards the axis and forms a central vortex which has the shape of a hollow cylindrical liquid body. In said cylindrical body the liquid rotates very rapidly while moreover it has quite a great axial velocity component as a result of which the liquid discharges rapidly through the overflow aperture. At the same time a hollow core is formed around the axis of the hydrocyclone, the diameter of which depends among other things upon the diameter of the overflow aperture. In the case under discussion where the apex aperture is small, the hollow air-filled core has a larger diameter than the apex aperture.

In a cyclone current as described hereinbefore the tangential velocity component is found to increase with a decrease of the radius of rotation. From theoretical and experimental observations it has appeared that said increase of the tangential velocity component towards the axis ceases at a given point, namely at the contact of the downward vortex and the central vortex proceeding towards the overflow aperture. The liquid outside the central cylinder has a centripetal radial velocity component which increases as the distance towards the axis decreases; within the central cylinder, however, there is almost no such radial velocity component. Unlike in the region outside the central cylinder, the tangential velocity component in the cylinder decreases towards the axis. Only the axial flow component can increase towards the axis.

When, together with the liquid, solid particles of a specific gravity higher than that of the liquid are introduced into the hydrocyclone, it appears that said particles proceed along a helical path along the wall towards the apex of the hydrocyclone from where they are wholly or partly entrained into the central cylinder.

When in a medium, having a specific gravity $d_1$, two particles of different specific gravities $d_a$ and $d_b$ are located in the central cylinder at equal distances from the axis, said particles will, as a result of the rapid rotational movement, be subjected to radially directed accelerations which are in the proportion of $$\frac{(d_a-d_1)d_b}{(d_b-d_1)d_a}$$

When the initial velocity in a radial sense is put equal to zero, the distance travelled by the two particles during a given period will be in the same proportion.

As long as the radial velocity of the particles is still very low with respect to the liquid, the resistance met by the particles during their movement may still be neglected. By approximation the distances travelled are then independent of the size of the particles. With increasing velocities the distances travelled by the particles will not only depend upon the specific gravities but also upon the size and shape of the particles. In this case, the smaller particles meet with a relatively higher resistance than the bigger ones so that the former will fall behind.

By properly selecting the shape and dimensions of the hydrocyclone and the feed pressure, it has been found possible to attain that all, or at least substantially all, specifically light particles will be entrained into the central cylinder together with part of the specifically heavy particles, and that the magnitude of the centrifugal forces acting upon the particles and the period during which the particles are exposed to said forces—i. e. the period needed by the liquid to move through the central cylinder from the apex to the edge of the overflow aperture or of the vortex finder—are such that the particles of the higher specific gravity will just in time be forced out of the current leaving through the overflow aperture whereas the particles of a lower specific gravity do not get an opportunity to escape from the said cylinder.

Owing to this the particles of lighter specific gravity are discharged with the overflow fraction. The particles of higher specific gravity are flung towards the wall where they get into the liquid current directed towards the apex. Partly they are again drawn into the central cylinder while the other part is concentrated at the apex.

When the concentration of the specifically heavier particles in the apex is still small, these particles cannot leave through the apex aperture, since, as mentioned above, the apex aperture is smaller than the central air-filled core in the hydrocyclone. If this concentration increases, however, it appears that at a given concentration the specifically heavier particles retard the rotational movement near the apex to such a degree that the central air-filled core is at that spot narrowed so much that said particles can leave through the apex aperture.

From this it appears that, when the apex aperture of a hydrocyclone of the type described here debouches freely into the atmosphere, a good regulating effect may be attained. If the number of specifically heavier particles in the feed increases, the volume of the apex fraction will rise automatically. Even if there are no specifically heavier particles present, the particles of lower specific gravity cannot leave through the apex aperture. Practically all of the washing liquid used then leaves through the overflow aperture. The concentration of the apex fraction therefore is practically independent of the concentration of the heavy particles in the feed.

From these observations it will be clear that, in contradistinction to the operation of the hydrocyclones used so far, the operation of this automatic discharge requires that the hydrocyclone be as much as possible arranged with its apex pointing downwards. For, the heavy particles can only escape when their concentration at the apex has become so high that on account thereof the rotation is retarded to such a degree that the hollow air-filled core collapses at the apex and the heavy particles can reach the apex aperture. If the apex were not directed downwards the only slowly rotating particles could not leave through the apex aperture. This effect has been clearly demonstrated in tests.

It will furthermore be clear from the foregoing that with a medium having a specific gravity which is very low in comparison with the specific gravity of the particles to be separated, washing will be very difficult, as the ratio $$\frac{(d_a-d_1)d_b}{(d_b-d_1)d_a}$$

approaches too close to 1. A good separation between coal and shale particles can thus very well be carried out in water, whereas this cannot be done in air.

The effect described above does also occur in prior hydrocyclones, but only as a secondary phenemon, which substantially does not affect the separation. Under certain conditions only, which conditions constitute the object of the present invention, said effect can be utilized for performing specific gravity separations in which use is made of liquids or suspensions that up to the present could not be applied for the purpose.

Generally, the hydrocyclones to be used must have an apex aperture the diameter of which is equal to or smaller than 0.7 time that of the overflow aperture. At the intersection between the cone and the imaginary cylinder, which runs parallel to the axis and passes through the edge of the overflow aperture, the wall of the conical section should form an angle between 25° and 45°, preferably between 30° and 40°, with the axis.

The feed aperture may have various shapes. The best performance is obtained if the surface of this aperture measured perpendicular to the axis of the feed pipe is 0.1 to 0.4 time the area of the overflow aperture. It has furthermore appeared that the body of the hydrocyclone need only be small. Various diameters may be used. The best results are obtained with a diameter of 2–3 times the diameter of the overflow aperture.

Of great importance is the ratio between the distance from the tapering wall of the hydrocyclone to the edge of the vortex finder and the diameter of the vortex finder. This ratio may vary between 4 and 0.3. The absolute size of the hydrocyclone is influenced by the mean particle size of the mixture to be separated. The smaller these particles, the smaller the absolute size selected. The pressure exerted on the feed is adapted thereto. For instance for separating particles having a mean grain size of 60 μ, a hydrocyclone of about 100 mm. in diameter is used at a feed pressure of 1 atmosphere gauge pressure.

From the foregoing it will be clear that the desired separating density can be adjusted in various ways. In general the separating density will be adjusted to a value of from 1 to 1.6 times the specific gravity of the washing liquid or of the washing suspension occurring in the apex fraction.

It is possible to wash at a separating density higher than 1.6 times the specific gravity of the used washing liquid or washing suspension.

In that case it appears, however, that in the practical application of the process the separation frequently becomes less sharp.

The importance of the invention becomes manifest when considering the technically applicable maximal separating densities which according to the invention can be attained with various washing liquids: water 1.6, loess or slate suspension 2.9, baryta 4.4, magnetite 4.6 etc.

As a result it is possible to wash ores with the same inexpensive weighting materials as are used for example in the washing of coal. As regards the washing of ores, the invention also provides the attractive method of applying the fine gangue as a suspension material. In the foodstuff industry nearly all washing processes may be performed with the help of water; the usually undesirable admixture of foreign substances in these products can thus be avoided. Of great importance is the possibility of washing crude coal sludge with water without the addition of a weighting material being required.

It stands to reason that the resultant separation will never be entirely complete. The heavy fraction will always be somewhat contaminated with light particles while the light fraction will never be quite free of the heavy particles.

In general it can be said that the magnitude of the error will depend on the aforementioned ratio:

$$\frac{(d_a-d_1)d_b}{(d_b-d_1)d_a}$$

The more this ratio deviates from unity the purer the fractions.

When under certain conditions the separating density will be raised by a given measure, this will result in a higher purity of the heavier fraction. For, in this case the particles of the lower specific gravity will be more thoroughly separated. The purity of the lighter fraction is raised by lowering the separating density.

From the theoretical observations given in the introduction, it will be clear that the separating density, and hence the purity of the separated fractions, can be influenced by varying the length of the vortex finder. When the vortex finder is shortened the liquid in the central cylinder will have to travel a longer distance before reaching the vortex finder so that the particles will for a longer period be subjected to the centrifugal forces. Consequently, more particles will be forced towards the periphery of the hydrocyclone. The separating density drops and the purity of the light fraction increases. Conversely, a longer vortex finder will result in a higher separating density while at the same time the percentage of contaminations in the heavy fraction will be decreased.

By rendering the length of the vortex finder regulable it is possible therefore to control the separating density and the attendant degree of contamination of the fractions.

A second method of adjusting the separating density consists in varying the dimensions of the apex aperture. An enlargement of the diameter tends to decrease the separating density; a reduction of said diameter results in an increase of the separating density.

A third possibility of regulating the washing process in a hydrocyclone comprises collecting the overflow fraction in a closed space and varying the pressure in said space, for example by discharging the liquid from said space via a throttling valve or another type of regulable flow resistance or by passing the overflow fraction through a vertical riser which is adjustable as to length. The latter regulating method is particularly attractive for actual practice because it does not call for any alterations in the construction of the hydrocyclone. Should the separating density fall, for instance owing to the fact that the apex aperture has worn out, the original separating density may be easily re-adjusted by reducing the overpressure.

In order to increase the capacity a number of hydrocyclones can be arranged in parallel. It is also advantageous to combine a number of hydrocyclones into a multiple hydrocyclone in which case the hydrocyclones are arranged in a constructional unit which is provided with a common feed and a common discharge pipe, whereas the hydrocyclones may consist of bores arranged in a block of homogeneous material.

The above described process and apparatus, by which the mixture to be separated is treated in one stage can be applied when either the separation is easy to perform or no high demands need be made upon the sharpness of the separation or when only one of the components need be recovered in a rather pure form.

However, if higher demands are to be made upon the separation it will be necessary to perform the process in several stages. It has already been proposed that with mixtures which are difficult to separate a number of hydrocyclones be arranged in succession so that one or both fractions obtained from the first cyclone can be subjected to a secondary treatment in following hydrocyclones in a second stage. A very satisfactory separation is obtained when this process is altered in such a way that the separation according to the process of the invention is carried out in a number of stages while in at least two of said stages use is made of hydrocyclones or groups of hydrocyclones arranged in parallel which are adjusted to different separating densities.

The overflow fraction obtained in the first stage will then as a rule be washed at a lower, the apex fraction at a higher separating density. As the apex fraction is always strongly concentrated so that it has a high viscosity, it must be diluted with washing liquid in order to render it suitable for further treatment. This washing liquid may be either fresh washing liquid or washing liquid which has been recovered or regenerated in another stage of the process. It stands to reason, that it is also possible to use in this case a washing liquid with another e. g. a higher specific gravity than in the first stage.

The finally obtained fraction of the lowest specific gravity is too strongly diluted for further processing. Concentrating or thickening the washing liquid can be performed in the cyclone thickeners known from the Dutch patent specification No. 48,934.

The apex fraction of these cyclone thickeners consists of the concentrate of the lighter fraction. The overflow fraction, consisting of washing liquid possibly contaminated by very small particles of the lightest fraction, can be recycled.

Intermediate fractions which are obtained in the successive stages, for example as overflow fraction of a cyclone washer in which the apex fraction of a preceding hydrocyclone is subjected to a secondary treatment, may be treated in different ways depending on the composition of the mixture. When the mixture to be separated is composed of two kinds of particles differing in specific gravity so that the separated intermediate fraction consists of a mixture of said two kinds of particles, said intermediate fraction may be returned to a previous stage so that a recirculation occurs. If, however, the mixture to be separated contains many particles of a specific gravity intermediate between the specific gravities of the particles of the main fractions, these particles will be mainly collected in an intermediate fraction.

A complete recirculation would then result either in a too high contamination of the final fractions or in an accumulation of these particles, as a result of which the separation process would be impeded. In such a case it will be advisable to recover the intermediate fractions separately or to recycle only part thereof.

In general, the hydrocyclones or groups of parallel hydrocyclones operating in each stage are fed by a separate pump. These pumps are connected with a pump cistern in which the mixture to be treated in that stage is mixed with the required amount of washing liquid.

In some cases, however, the overflow fraction may be treated further without the insertion of a pump being required which can be realized by exerting such a back pressure upon the overflow fraction of the preceding hydrocyclone or group of hydrocyclones as will be sufficiently high to be used for operating the following group, which method has been described in the Dutch patent application No. 152,725.

The application of one or more pumps can also be avoided by installing the following group of hydrocyclones at a so much lower level that as a result thereof a sufficiently high hydrostatic pressure is created.

Figure 4A:
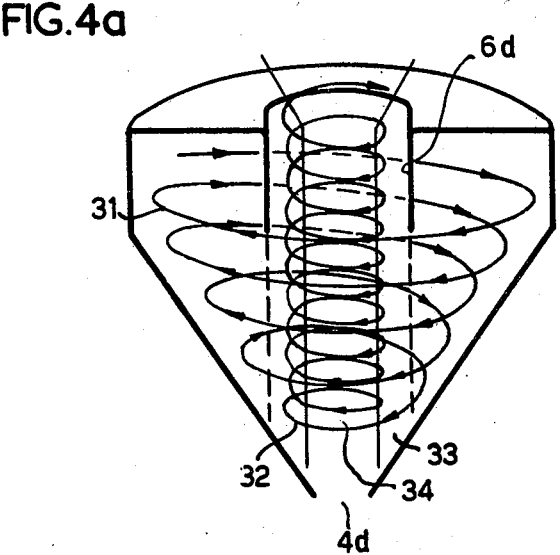
Figure 4B:
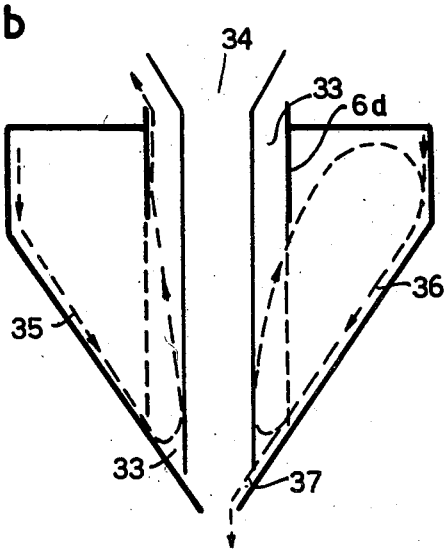
Figure 12:
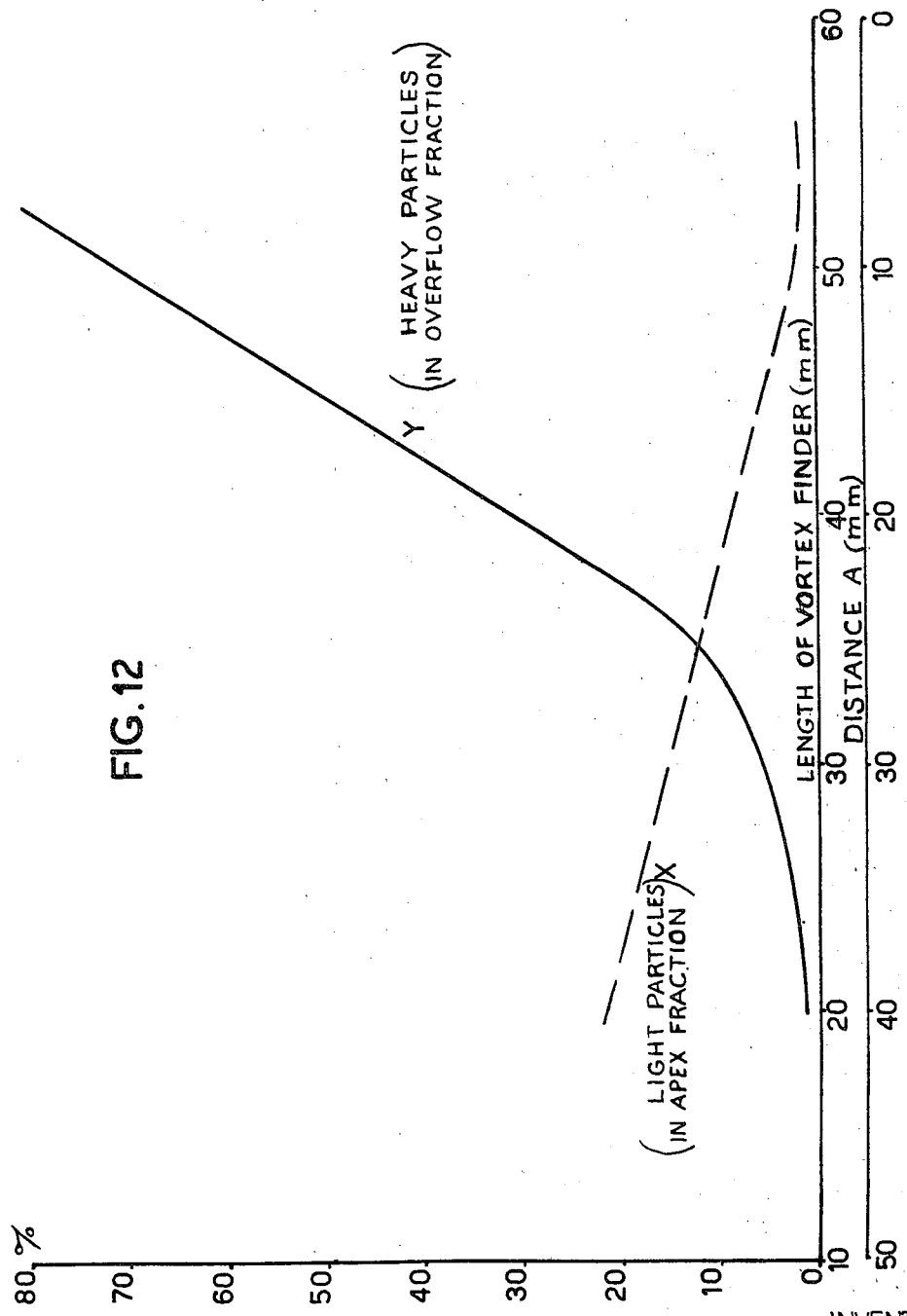

The invention will now be further elucidated with the help of a number of examples and figures. Figures 1, 2, 3, 5 and 6 represent some embodiments of hydrocyclones according to the invention. Figures 4a and 4b are diagrammatic views of the movement of the particles in a hydrocyclone, Figures 7–11 being diagrams of apparatuses for washing mixtures in which a combination of hydrocyclones is applied. Figure 12 is a graph illustrating the relationship between a significant hydrocyclone dimension and the efficiency of separation. Identical reference numerals differentiated by small letter suffixes are used to indicate corresponding elements in different embodiments.

Figures 1 and 2 are cross sectional views of two simple embodiments of hydrocyclones according to the invention. The vortex chamber 1 consists of a cylindrical section or chamber portion 2 upon which a conical section or chamber portion 3 has been screwed. The apex aperture 4 is formed by a screwed-on mouth piece 5 which can be exchanged so that the width of the apex aperture is variable.

The feed pipe 8 which is in tangential relation to the vortex chamber, debouches into the cylindrical section. In the embodiment shown in Figure 1 this feed pipe is provided with a connection 28 while in the embodiment according to Figure 2 said connection is formed by a connecting flange 59.

The tubular member or vortex finder 6 has been threadedly mounted in the collar 27 provided on the top plate or end wall 7 of the cylindrical section 2. The length of that part of the vortex finder extending into the hydrocyclone—which part for briefness' sake will hereafter be termed "the length of the vortex finder"—and hence also the distance between the lower edge of the vortex finder and the conical wall—in Figures 1 and 2 the distance A—can thus be varied.

In the construction according to Figure 2 a discharge pipe 11 has been connected to the vortex finder by means of an internally threaded intermediate member 29. A hexagonal member 58 welded upon the vortex finder enables the vortex finder to be turned so that the latter can be raised and lowered.

In the construction shown in Figure 1 the vortex finder debouches into a cylindrical hood 9 which has been threadedly mounted on the vertical edge 12 of the vortex chamber 1. The overflow fraction is carried off through a discharge pipe 10 in tangential relation to said hood, said pipe being provided with a nipple 30 for enabling the connection of another discharge pipe.

In Figure 1 has been indicated a collecting apparatus for the apex fraction, consisting of a container 48, which is at its lower end provided with an open discharge duct 49.

Figure 3 shows a slightly modified construction of a hydrocyclone according to the invention. Also here the vortex chamber 1b consists of a cylindrical section 2b into which the tangentially directed feed pipe 8b debouches and an adjacent conical section 3b. Adjacent to said conical section there is the mouthpiece 5b. The connecting surfaces of these parts consist of flanges clamped together by means of bolts.

The mouthpiece 5b contains an annular diaphragm 20 which is clamped between the flanges 18 and 19 and the annular block 23.

The pressure in the annular aperture 21, formed between the said diaphragm and the ring 23, can be varied through the pipe 22 as a result of which the diameter of the apex aperture 4b can be changed. The apex fraction can be collected in the receiver pipe 24.

The space between the axially movable vortex finder 6b and the top 7b of the vortex chamber is sealed by the flange 13 welded upon the wall 7b into which flange a packing 14 is pressed by means of a gland 15 and a set of drawbolts. By means of screwthread 17 the vortex finder is mounted inside the hood 9b which rests upon the supporting members 25 on top of the hydrocyclone. A hand wheel 16 is mounted upon the vortex finder. When turning said wheel the vortex finder is moved in an axial direction. The discharge pipe 10b of the hood is provided with a valve 26 by means of which the back pressure exerted upon the overflow aperture can be regulated.

In the constructional forms shown in the Figures 1–3 the apex aperture is always smaller than 0.7 time the diameter of the overflow aperture, the diameter of the feed aperture being equal to or lower than ½ times the diameter of the overflow aperture; this means that the areas of the feed and overflow apertures are in the proportion of 0.25:1. Half the apex angle ranges between 25° and 45°.

In order to elucidate the mechanism of the separation, the course of the particles which are suspended in a separating suspension has been illustrated in the Figures 4a and 4b. For the sake of simplicity the feed pipe has been omitted in the drawing. Figure 4a is a perspective view of the course of the washing liquid in the hydrocyclone. The liquid proceeds along a helical path, approximately according to the line 31, towards the apex of the cyclone. At this point a rapidly-rotating second vortex 32 is formed which leaves the vortex chamber through the vortex finder. The generation of this second vortex is attended by the formation of an air-filled core 34 as a result of which the central vortex adopts the shape of a hollow cylinder 33 the thickness of which has been exaggerated in the drawings. The apex aperture 4d has been made so narrow that its diameter is smaller than that of the hollow air-filled core 34 so that no liquid can escape through the apex aperture.

The reference numerals 35 and 36, respectively in Figure 4b denote the paths travelled in an axial and radial sense by a particle of lower specific gravity and by a particle of higher specific gravity respectively. From the infeed these two kinds of particles proceed spirally along the wall towards the apex of the hydrocyclone where they get into the central cylinder and are subjected to the strong centrifugal forces prevailing therein while being carried towards the vortex finder 6d by the liquid current.

The radial deviation of the specifically lighter particles is not sufficient for enabling them to leave the central cylinder, so that these particles are entrained into the vortex finder 6d. The particles of higher specific gravity, on the other hand, experience such a great radial deviation that they have already been expelled from the central cylinder at the point where the latter enters the vortex finder. These particles are subsequently recycled. As only part of the heavy particles will be entrained, the concentration of solid particles near the apex gradually increases. This has a gradual retarding effect on the speed of rotation, as a result of which the heavy particles can leave the hydrocyclone along the line 37.

It will be clear that, when the vortex finder 6d is lengthened, more particles will be caught.

*Example 1*

In a hydrocyclone according to Figure 2 a raw coal having a grain size of from 0 to 10 mm. was washed with the help of water. The concentration had been adjusted to 150 grams of coal per litre; the feed pressure being 0.5 atmosphere gauge pressure.

The dimensions of the hydrocyclone were as follows:

Diameter of the vortex chamber_____mm__ 350
Diameter of the feed aperture_____mm__ 70
Diameter of the apex aperture_____mm__ 60
Diameter of the overflow aperture_____mm__ 150
Length of the cylindrical section_____mm__ 230
Half apex angle_____degrees__ 37½

The distance from the edge of the vortex finder to the conical wall (distance A) was varied.
The results obtained were as follows:

| Length of the vortex finder | | 100 mm | 200 mm | 300 mm. |
|---|---|---|---|---|
| Distance A | | 260 mm | 160 mm | 60 mm. |
| Amount of liquid/hour | apex | 6.27 m.³/h | 2.37 m.³/h | 1.04 m.³/h. |
| | overflow | 116 m.³/h | 99.5 m.³/h | 114.3 m.³/h. |
| Amount of solid material/hour | apex | 5.5 t./h | 2.37 t./h | 1.25 t./h. |
| | overflow | 4.4 t./h | 4.1 t./h | 9.4 t./h. |
| Separating density for a grain size of | 1-2 mm | 1.55 | 1.85 | >2.6. |
| | 2-4 mm | 1.41 | 1.68 | >2.6. |
| | >4 mm | 1.35 | 1.61 | >2.6. |

From these results it appears that a reduction of the distance from the edge of the vortex finder to the conical wall results in an increase of the separating density. When comparing the compositions of the fractions it appears that the separating density for the small grain-sizes is higher than for the bigger grain-sizes. This implies that with the small grain-size relatively more heavy particles are entrained through the vortex finder.

In the hydrocyclone mentioned above the distance from the edge of the vortex finder to the conical wall (distance A) was subsequently adjusted to 110 mm. (length of the vortex finder 250 mm). Then the diameter of the apex aperture was varied. A suspension of raw coal of 0-6 mm. was supplied at a concentration of 100 grams per litre of water at a feed pressure of 1.0 atm. gauge pressure. With an apex aperture of 50 mm. in diameter the capacity of the overflow fraction proved to be 86 m.³/h. of liquid, containing 5 t./h. of solid material, the capacity of the apex fraction being 4 m.³/h. of liquid, containing 4 t./h. of solid material.

The solids contained in both the apex fraction and the overflow fraction were subsequently separated according to a separating density of 1.6. It appeared that 85% of the apex fraction had a specific gravity >1.6, the corresponding percentage for the overflow fraction being 11.

When the diameter of the apex aperture was increased to 65 mm., the percentage of particles with a specific gravity >1.6 in the apex fraction was found to have decreased to 65% while in the overflow fraction the percentage of particles with a specific gravity >1.6 had dropped to 7%. If, however, the diameter of the apex fraction is reduced to 35 mm., the percentage of particles having a specific gravity >1.6 in the apex fraction becomes 87% while in the overflow fraction the percentage of particles with a specific gravity >1.6 rises to 25%.

From this it appears that a reduction of the diameter of the apex aperture results in an increase of the number of heavy particles in the overflow fraction and hence in a higher separating density.

*Example 2*

A mixture of coal and sand having a particle size of from 125 to 500μ was mixed with water to give a suspension of 100 g. solid matter per litre and forced through a hydrocyclone according to Figure 1 at a feed pressure of 0.5 atm. gauge pressure.

The dimensions of the hydrocylone were as follows:

Diameter of the vortex chamber_____mm__ 60
Diameter of the feed aperture_____mm__ 12
Diameter of the apex aperture_____mm__ 11
Length of the cylindrical section_____mm__ 38
Diameter of the vortex finder_____mm__ 25
Half apex angle_____degrees__ 37½

Every hour about 1.5 m.³ of liquid containing an amount of solid matter of 0.15 t./h. were treated. The distance from the edge of the vortex finder to the conical wall (distance A) was varied. The relationship between said distance and the amount of heavy particles in the overflow fraction and the amount of light particles in the apex fraction is given in Figure 12. The length of the vortex finder (increasing from 20-55 mm.) and the distance A (decreasing from 40-5 mm.) respectively have been plotted on the horizontal axis. The percentage of particles which has got into the wrong fraction has been plotted on the vertical axis. The line X denotes the percentage of light particles found in the apex fraction, the curve Y refers to the percentage of heavy particles in the overflow fraction.

In order to determine the influence of the concentration of the added mixture of coal+sand and water, the length of the vortex finder in the aforementioned hydrocyclone was adjusted to 35 mm. (distance from lower edge of vortex finder to conical wall 25 mm.) while at a feed pressure of 0.5 atm. gauge pressure suspensions containing different amounts of solid matter per litre were successively passed through the hydrocyclone. The results obtained in these experiments were as follows:

| Concentration of the feed in g./l. | Percentage of coal in apex fraction | Percentage of sand in overflow fraction |
|---|---|---|
| 50 | 3.2 | 1.4 |
| 100 | 4.7 | 2.3 |
| 150 | 5.7 | 7.0 |
| 200 | 8.2 | 35.6 |
| 250 | 13.2 | 35.8 |

This table clearly proves that the separating effect is very unfavourably influenced by too high concentrations.

*Example 3*

Raw coal sludge suspended in liquids of different specific gravities was supplied at a gauge pressure of 0.5 atm. to a hydrocyclone of the type described in Example 2 in which the length of the vortex finder had been adjusted to 38 mm. (distance A 23 mm.). The particle size of the mixture ranged from 0.2 to 0.5 mm. The concentration of solid matter in all suspensions amounted to 150 g./l. Water, in which different amounts of calcium nitrate had been dissolved, was used as a carrier liquid.

These experiments gave the following results:

| Sp. gr. of the feed | Percentage of coal in apex fraction | Percentage of shale in overflow fraction |
|---|---|---|
| 1.0 | 10.7 | 30.9 |
| 1.1 | 5.4 | 37.6 |
| 1.2 | 2.1 | 50.8 |
| 1.3 | 0.7 | 56.0 |

From this appears that with increasing specific gravity of the carrier liquid the percentage of coal in the apex fraction drops sharply it is true, but that at the same time the percentage of shale in the overflow fraction rises considerably. The latter phenomenon is easily understood; owing to the low apparent specific gravity of the particles in the liquid, the forces acting upon these particles while they are being carried upwards through the hollow central cylinder are smaller as a result whereof also the distance which the particles are forced to travel in a radial sense is reduced. However, if by shortening the vortex finder also the distance to be traveled by the particles in an axial sense is increased, so that the particles are exposed for a longer period to the influence of the centrifugal forces, a better separation will be obtained.

If for example a calcium nitrate solution, having a specific gravity of 1.2, is used as a carrier liquid and the vortex finder is adjusted to different lengths, the following results are obtained:

| Distance A | Length of vortex finder | Percentage of coal in apex fraction | Percentage of shale in overflow fraction |
|---|---|---|---|
| 23 | 38 | 2.1 | 50.8 |
| 28 | 33 | 2.3 | 42.1 |
| 31 | 30 | 2.4 | 35.9 |
| 34 | 27 | 2.6 | 28.4 |
| 41 | 20 | 2.8 | 23.7 |

Although now, as might be expected, the quality of the apex fraction decreases somewhat, the overflow fraction, however, shows a very marked improvement.

*Example 4*

In order to demonstrate the influence of the ratio between the cross sectional area of the feed ducts and the area of the overflow aperture, the following comparative test was performed in which two hydrocyclones according to the drawing shown in Figure 1 were used, both having a vortex chamber measuring 60 mm. in diameter, a half apex angle of 30°, a cylindrical section measuring 38 mm. in length and a tangentially directed feed pipe of 14 mm. in diameter.

In the first hydrocyclone we used a vortex finder of 26 mm. in diameter, the vortex finder used in the second hydrocyclone having a diameter of 16 mm. Both hydrocyclones were fed with a suspension of raw coal having a particle size of from 0.06 to 0.5 mm. which was introduced at a gauge pressure of 0.5 atm. The length of the vortex finder and the diameter of the apex aperture were adjusted in such a way as to obtain the best possible separation. The results of this test are given hereafter.

|  | First hydrocyclone | | Second hydrocyclone | |
|---|---|---|---|---|
| Length of vortex finder | 48 mm. | | 26 mm. | |
| Distance A | 19 mm. | | 50 mm. | |
| Diameter of apex aperture | 9 mm. | | 6 mm. | |
| Capacity of the overflow | 1.8 m.³ containing 210 kgs. of solid matter per hour. | | 1.25 m.³ containing 91 kgs. of solid matter per hour. | |
| Capacity of the apex | 0.1 m.³ containing 5.1 kgs. of solid matter per hour. | | 0.027 m.³ containing 1.3 kgs. of solid matter per hour. | |
|  | Percentage of coal in apex fraction | Percentage of shale in overflow fraction | Percentage of coal in apex fraction | Percentage of shale in overflow fraction |
| Particle size in μ: | | | | |
| 350–500 | 1.2 | 0.1 | 5.0 | 0.4 |
| 210–350 | 2.1 | 0.2 | 6.1 | 1.2 |
| 125–210 | 2.1 | 1.1 | 6.0 | 4.2 |
| 60–125 | 1.9 | 7.5 | 5.0 | 13.6 |

From this it appears that with the first hydrocyclone, where the ratio between the areas of the feed and overflow apertures was equal to 0.29, a far better separation than the second hydrocyclone where said ratio amounted to 0.77 was obtained.

*Example 5*

Through a hydrocyclone shown in Figure 1 and having the following dimensions:

Diameter vortex chamber_____mm__ 60
Diameter feed aperture_____mm__ 12
Diameter vortex finder_____mm__ 25
Diameter apex aperture_____mm__ 11
Half apex angle_____degrees__ 37½
Length of cylindrical section_____mm__ 38 a mixture of sand and coal, having a particle size of <0.5 mm. and being suspended in water, was passed at different feed pressures ranging from 0.1 to 1 atm. gauge pressure.

In each case, the vortex finder was so adjusted as to obtain apex fractions with the same percentage of coal. The results obtained were as follows:

| Pressure in atmospheres gauge pressure | 0.1 | 0.25 | 0.5 | 1.0 |
|---|---|---|---|---|
| Length of vortex finder in mm | 55 | 45 | 37.5 | 33 |
| Distance A | 6 | 16 | 23.5 | 28 |
| Feed capacity in cc./sec. | 181 | 358 | 431 | 662 |
| Percentage of sand in the overflow fraction | 30.0 | 19.3 | 12.4 | 14.1 |
| Percentage of coal in apex fraction | 12 | 12 | 12 | 12 |

From this appears that when the percentage of impurities in the apex fraction is kept constant, the pressure affords a means for controlling the percentage of impurities in the overflow fraction.

*Example 6*

The result of the separation can be influenced in the same manner by exerting a back pressure upon the overflow aperture. This can be demonstrated by means of the following test.

The discharge pipe 10 of a hydrocyclone according to Figure 1 was provided with a valve while before said valve a manometer was mounted on the pipe. The dimensions of the hydrocyclone were as follows:

Diameter of vortex chamber_____mm__ 60
Diameter of feed aperture_____mm__ 12
Diameter of vortex finder_____mm__ 25
Diameter of apex aperture_____mm__ 11
Half apex angle_____degrees__ 37½
Length of cylindrical section_____mm__ 38
Length of vortex finder_____mm__ 28
Distance A_____mm__ 33

A coal sludge, having a particle size of from 125 to 500μ with water as a carrier liquid was supplied at a gauge pressure of 0.5 atm.

It was found that when no back pressure was exerted, the overflow had a capacity of 1.55 m.³/h. with a concentration of 90 g./l. solid matter, while the capacity of the apex amounted to 0.032 m.³/h. with a concentration of 1000 g./l. solid matter.

Of the solid matter contained in the apex fraction 32% proved to have a specific gravity of <1.6, 3.2% of the solids occurring in the overflow fraction having a specific gravity of >1.6.

When, by partly closing the valve, the back pressure on the overflow aperture was adjusted to 0.1 atm. gauge pressure, the capacity of the overflow fraction proved to amount to 1.13 m.³/h. of liquid having a concentration of solid material of 70 g./l., the capacity of the apex fraction being 0.054 m.³/h. with a concentration of 900 grams of solids per litre.

It was found that 57.9% of the solid matter in the apex fraction had a specific gravity of <1.6, 1.8% of the solids in the overflow fraction having a specific gravity of >1.6

*Example 7*

A mixture of palm-kernels and shells with water as a carrier liquid was forced at a pressure of 0.5 atm. gauge pressure through a hydrocyclone as shown in Figure 2, the dimensions of which were as follows:

Diameter of the vortex chamber_____mm__ 350
Diameter of the feed aperture_____mm__ 70
Diameter of the vortex finder_____mm__ 150
Diameter of the apex aperture_____mm__ 40
Half apex angle_____degrees__ 37½
Length of the cylindrical section_____mm__ 350
Length of the vortex finder_____mm__ 150
Distance A_____mm__ 330

The palm-kernels have a specific gravity of about 1.1, the shells having a specific gravity of about 1.25. The hydrocyclone was found to treat an amount of about 4 tons of the mixture per hour at a liquid consumption of 70 m.³/h. The separation proved to be complete.

When using a continuously operating apparatus, the overflow fraction containing nothing but the kernels, and the apex fraction containing nothing but the shells, may be individually freed from the water on a screen, whereafter all or part of said water may be returned into a mixing trough, to which also the mixture of kernels and shells to be separated may be supplied, for instance by means of a conveyor screw. Part of the water used will have to be removed if too much impurities have accumulated therein, in which case the quantity of make-up water will have to be increased; from the mixing trough the mixture may then be fed to the hydrocyclone by means of a pump.

*Example 8*

For separating a mixture of sand and magnetite having a grain-size of from 210 to 350μ, use was made of a hydrocyclone as shown in Figure 1, the dimensions of which were as follows:

Diameter of the vortex chamber_____mm__ 60
Diameter of the feed aperture_____mm__ 12
Diameter of the vortex finder_____mm__ 25
Diameter of the apex aperture_____mm__ 10
Half apex angle_____degrees__ 37½
Length of the cylindrical section_____mm__ 40

The length of the vortex finder was varied. The carrier liquid used consisted of a suspension of finely-crushed magnetite, in which the mixture to be separated was suspended in a concentration of about 200 grams per litre. The feed pressure amounted to 0.5 atm. gauge pressure. The results obtained were as follows:

| Specific gravity of the suspension | 1.00 | 1.60 | | 1.89 | |
|---|---|---|---|---|---|
| Length of the vortex finder | 56 | 43 | 33 | 33 | 30 |
| Distance A | 7 | 20 | 30 | 30 | 33 |
| Sp. gr. of suspension in overflow fraction | 1.00 | 1.57 | 1.58 | 1.88 | 1.89 |
| Sp. gr. of suspension in apex fraction | 1.00 | 2.02 | 2.0 | 2.22 | 2.21 |
| Percentage of infed sand in the apex fraction | 49.2 | 14.4 | 30.7 | 5.0 | 20.6 |
| Percentage of infed coarse magnetite in the overflow fraction | 22.6 | 17.1 | 6.1 | 13.0 | 5.2 |
| Quantity of coarse material in kg./h. in overflow fraction | 170 | 130 | 91 | 134 | 91 |
| Quantity of coarse material in kg./h. in the apex fraction | 31 | 12 | 16 | 9 | 12.5 |

From the figures given for the specific gravities of the overflow and apex fractions, which specific gravities were determined after removal of the coarse particles, it follows that the carrier suspension used was practically stable.

The thickening effect is only slight. However, washing has been carried out at a separating density higher than 2.6, which is considerably higher than the specific gravity of the apex fraction.

*Example 9*

Through a hydrocyclone as shown in Figure 2 and having the following dimensions:

Diameter of the vortex chamber_____mm__ 120
Diameter of the feed aperture_____mm__ 24
Diameter of the vortex finder_____mm__ 53
Diameter of the apex aperture_____mm__ 18
Half apex angle_____degrees__ 37½
Length of the cylindrical section_____mm__ 80
Distance A_____mm__ 24
Length of the vortex finder_____mm__ 100 a mixture of coarse magnetite and sand with a grain-size of from 0.5 to 3 mm., suspended in a suspension of fine sand (grain-size <60 μ) in water having a specific gravity of 1.7, was passed at a feed pressure of 1.0 atm. gauge pressure.

The concentration of the coarse material was 100 grams per litre. It appeared that with the help of this apparatus about 700 kg./h. of mixture could be washed. The percentage of the original sand with a grain-size >½ mm. found in the apex fraction, amounted to 15%. The percentage of the magnetite in the overflow fraction was 18.2%.

*Example 10*

The screen fraction of from 0.5 to 4 mm. of a lead ore, consisting of galena (sp. gr. 7.0) and quartz (sp. gr. 2.6) with a lead content of 3.85% was washed with a partly stable magnetite suspension (particle size <0.06 mm.) having a specific gravity of 2.4 in a hydrocyclone according to Figure 2 the dimensions of which were as follows:

| | | |
|---|---|---|
| Diameter of the vortex chamber | mm | 122 |
| Length of the cylindrical section | mm | 80 |
| Diameter of the feed aperture | mm | 24 |
| Diameter of the vortex finder | mm | 48 |
| Length of the vortex finder | mm | 48 |
| Distance A | mm | 80 |
| Diameter of the apex aperture | mm | 24 |
| Half apex angle | degrees | 37½ |

The feed concentration amounted to 200 grams of ore per litre. The feed pressure was 1 atm. gauge pressure. Every hour 9 m.³ of liquid were treated. The apex fraction amounted to 180 l./h. and contained 1300 grams of concentrate per litre. The percentage of lead was 27.9%. So the concentrate contained ±9.2% of the lead. The suspension in the apex fraction had a specific gravity of 2.4, the suspension in the overflow fraction having a specific gravity of 2.05. The separating density is above 3.0, so considerably higher than the specific gravity of the suspension in the apex fraction.

*Example 11*

A mixture of tin stone and sand was treated with water to which fine loess had been added, in a hydrocyclone according to Figure 2, the dimensions of which were as follows:

| | | |
|---|---|---|
| Diameter of the cylindrical section | mm | 122 |
| Length of the cylindrical section | mm | 80 |
| Diameter of the feed pipe | mm | 24 |
| Diameter of the vortex finder | mm | 48 |
| Length of the vortex finder | mm | 120 |
| Distance from edge of vortex finder to conical wall (distance A) | mm | 8 |
| Diameter of the apex aperture | mm | 20 |
| Half apex angle | degrees | 37½ |

The mixture of tin stone and sand had a grain-size of from 60 to 350 μ. The feed pressure was 0.5 atm. gauge pressure.

The overflow fraction as well as the apex fraction were separated with the help of a liquid having a specific gravity of 2.83. It was found that 89½% of the original tin stone occurred in the apex fraction, the concentration having risen to 11 × its original value.

Figure 5:
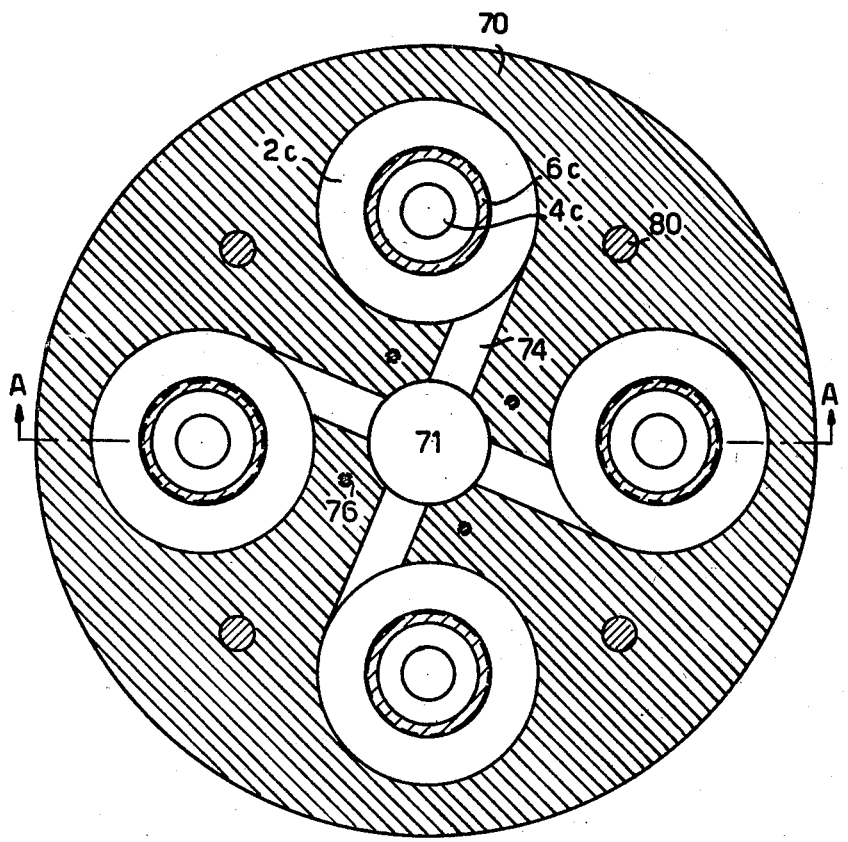
Figure 6:
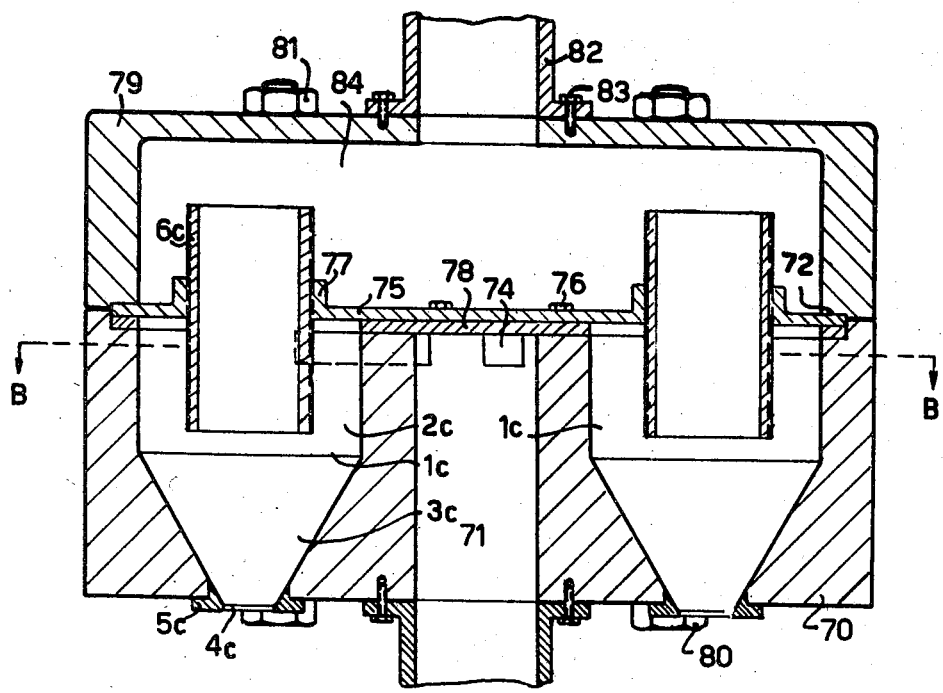

Figures 5 and 6 show a horizontal and a vertical cross-sectional view respectively of an apparatus consisting of four hydrocyclones arranged in parallel. Figure 6 is a section taken on the line A—A of Figure 5 and Figure 5 is a section taken on the line B—B of Figure 6. The vortex chambers 1c of said hydrocyclones, comprising a cylindrical section 2c and a conical section 3c, consist of bores formed in a block 70. The discharge aperture 4c is constituted by a mouthpiece 5c which has been screwed into the block 70. In the center of the block 70 the feed chamber 71 has been spared out. In the top surface of the block the feed channels 74 have been spared out which are in tangential relation to the vortex chambers 1c. The entire assembly is covered by a plate 75 which is provided with projections 77 through which the threaded vortex finders 6c can be moved up and down. In order to ensure a good sealing action of the plate, a packing 78 has been inserted between the plate and the block, said packing consisting of a circular disc of resilient material which is provided with perforations having the same diameter as the vortex chambers. The entire assembly is held together by the bolts 76 and the edge 72 of the hood 79 which, by means of the bolts 80 and the screws 81, can be clamped against the block 70. The hood 79 is provided with a central discharge pipe 82 which, by means of the bolts 83, is secured thereto.

When a liquid, in which the mixture to be separated has been suspended, is passed under pressure through the common feed duct 71, said mixture will be introduced into the vortex chambers 1c through the tangentially directed feed conduits 74. In these chambers the mixture is separated so that the particles of a lower specific gravity suspended in a large quantity of washing liquid are discharged through the vortex finders 6c, whereas the particles of a higher specific gravity together with a small quantity of suspension are carried off through the apex apertures 4c. The overflow fraction is collected in the common collecting chamber 84 located under the hood 79. From said chamber the overflow fraction is carried off through the common discharge pipe 82.

Figures 7–11 show some of the many possible diagrams of apparatuses suited for the washing of mixtures adjusted to different specific gravities, among which apparatuses there are some hydrocyclones or combinations of hydrocyclones.

In the apparatuses according to Figures 9 to 11, the product to be washed is supplied from the bunker 38 through a pipe 39 to a cistern. Each set consists of a cistern 41, 51 and 61 respectively, in which the product to be treated in the hydrocyclones 40, 50 and 60 respectively is mixed. Via the pipes 42, 52 and 62 respectively and by means of the pumps 43, 53 and 63 respectively the product is passed through the pipes 44, 54 and 64 respectively, which debouch tangentially into the hydrocyclones 40, 50 and 60 respectively. Here the product is separated into an apex fraction, mainly containing the particles of a higher, and an overflow fraction, mainly containing the particles of a lower specific gravity.

The apex fractions of these cyclones are carried off through the pipes 45, 55 and 65 respectively, the overflow fractions through the pipes 46, 56 and 66 respectively.

If necessary, washing liquid, which, if desired, may consist of regenerated washing liquid recuperated from the final stages, is fed into the cisterns via the pipes 47, 57 and 67 respectively.

The hydrocyclones 60 shown in the diagrams are adjusted to a lower and the hydrocyclones 50 to a higher separating density. The hydrocyclones 40 are adjusted to a separating density lying between those of the former, but may, if desired, be equal to either of these specific gravities.

Figure 7:
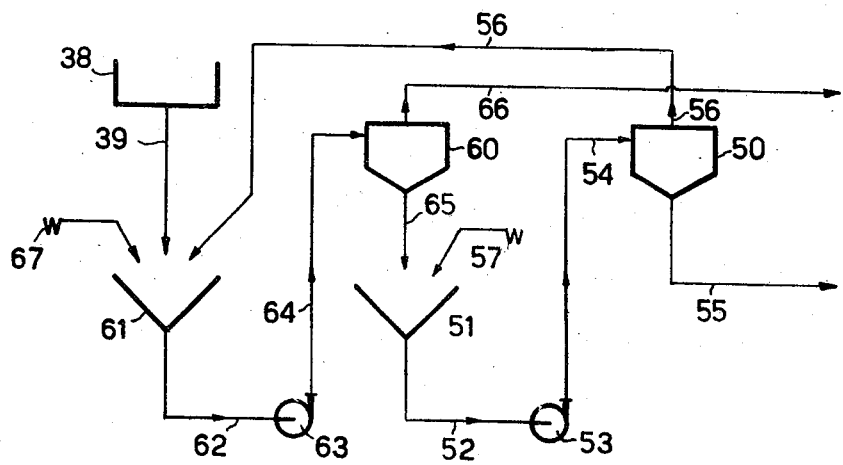
Figure 8:
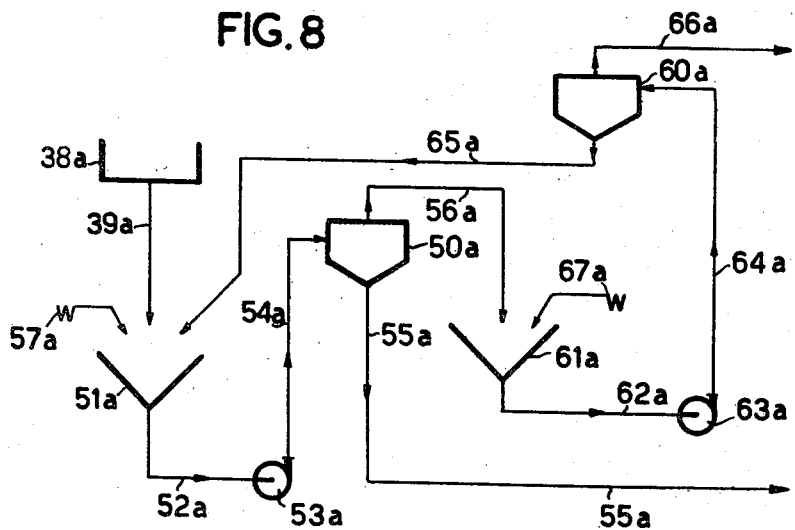

Figures 7 and 8 represent an apparatus for performing a separation into two stages. In Figures 7 and 8 the same numerals are used as in the above-mentioned figures representing a 3-stage apparatus. Numerals of the forty series do not occur in Figures 7 and 8 because of the fact that the stage adjusted to an intermediate density is lacking.

In the apparatus according to Figure 7, the apex fraction of the first stage, where the separation is carried out at a low separating density in the hydrocyclones 60, is subjected to a secondary treatment in a second stage in the hydrocyclones 50, which is adjusted to a high separating density.

The overflow fraction from this second stage contains relatively much light product, for which reason it is recycled through the pipe 56 to the cistern 61 of the hydrocyclones of the first stage 60. The apex fraction of the second stage and the overflow fraction of the first stage are carried off as final products through the pipes 55 and 66 respectively.

In the apparatus according to Figure 8, the apex fraction of the first stage, in which the hydrocyclones 50a are adjusted to a high separating density immediately constitutes the heavy final product which can be discharged through the pipe 55a. Through the pipe 56a, the overflow fraction is supplied to the second stage where it is subjected to a secondary treatment at a low separating density. The overflow fraction of this stage is carried off as the final product through the pipe 66a, the apex fraction being recycled to the cistern 51a of the first stage through the pipe 65a.

In the Figures 9–11 some diagrams of apparatuses are given, in which the separation is carried out in three stages. According to this method the mixture is subjected to a preliminary treatment in a first stage in the hydrocyclones 40, which are adjusted to a separating density lying between those at which the hydrocyclones 50 and 60 of the final stages are being operated.

Via the pipe 46 the overflow fraction of the first stage is supplied to the cistern 61 of the stage operating at a low separating density, while the apex fraction is supplied to the cistern 51 of the stage operated at a high separating density via the pipe 45.

The apex fraction of the hydrocyclones 50 again constitutes the specifically heavy final product, the overflow fraction of the hydrocyclones 60 being the specifically light final product. These products are carried off for further treatment through the pipes 55 and 66 respectively.

According to the diagram of Figure 9 the apex fraction of the hydrocyclones 60b, which have the lowest separating density, is recycled to the cistern 41b of the first stage, the overflow fraction of the hydrocyclones 50b, which are adjusted to the highest separating density, together with the overflow fraction from the first stage, being subjected to a secondary treatment in the hydrocyclones 60b.

In the diagram of Figure 10 the apex fraction of the first stage and of the stage adjusted to the lowest separating density, are supplied, through the pipes 45c and 65c respectively, to the stage adjusted to the highest separating density. The overflow fraction of this last stage is recycled to the cistern 41c of the first stage via the pipe 56c.

Figure 11 shows a third possibility. According to this method the apex fraction of the hydrocyclones adjusted to a low separating density and the overflow fraction of the hydrocyclones adjusted to a high separating density are recycled to the cistern of the first stage through the pipes 56d and 65d respectively.

It stands to reason that more variations are possible without departing from the scope of the invention.

In the various stages only so much water or fresh washing liquid will be added as is required. The necessity of adding water or fresh washing liquid always arises when an apex fraction has to be subjected to a secondary treatment because it is naturally too much concentrated and hence too viscous to be pumped.

The final products discharged through the pipes 55 and 56 respectively may be subjected to a secondary treatment in manners that are known in themselves, for example by screening them. It will often be possible and advantageous to thicken the overflow fraction in one or more cyclone thickeners before subjecting them to further treatments. The recuperated washing liquid may in this case be recycled through one or more of the pipes 47, 57 or 67.

In the apparatuses according to the diagrams all the intermediate products are invariably recycled. Sometimes this is not possible, for instance if there are many particles of an intermediate specific gravity. In this case recirculation will not, or only partly, be possible.

It will be clear that, at those points where a hydrocyclone is shown in the diagrams also a group of hydrocyclones arranged parallel, may be installed.

If the hydrocyclones are positioned at different levels it is possible in some cases to leave out one or more pumps. The gauge pressure required by the hydrocyclone is then exerted by the hydrostatic pressure. It is also possible for a hydrocyclone in a preceding stage to be operated at such a back pressure on the overflow aperture that this pressure suffices to operate a hydrocyclone of the following stage. It is, for instance, possible to leave out the pump 63a and the cistern 61a, shown in the diagram of Figure 8, when the vortex finder 56a is directly connected with the tangential feed pipe 64a of the hydrocyclone 60a. The hydrocyclone 50a will in that case have to be so adjusted as to enable it to operate a at gauge pressure of, say 0.5 atm. In this case the feed pressure will have to be raised by about 0.5 atm., while it will be necessary to close the apex aperture further.

*Example 12*

For washing raw coal sludge with a grain-size of from 0 to 1 mm. with water as a washing liquid, an apparatus according to Figure 11 was applied.

Raw coal sludge was fed from the bunker 38d into the cistern 41d, where it was mixed with water (pipe 47d) and with the recycled products from the discharge pipe 65d of the hydrocyclones 60d and from the vortex finder 56d of the hydrocyclones 50d. The concentration of solid material in the feed of the hydrocyclones 40d was maintained at 490 grams per litre.

The hydrocyclones used were of the type shown in Figure 2 and had the following dimensions:

| | |
|---|---|
| Diameter of the vortex chamber | mm 100 |
| Diameter of the feed aperture | mm 20.4 |
| Diameter of the vortex finder | mm 42 |
| Diameter of the apex aperture | mm 23 |
| Half apex angle | degrees 37½ |
| Length of the cylindrical section | mm 60 |

The vortex finders of the hydrocyclones 40d, 50d and 60d were adjusted to a length of 25, 40 and 20 mm. respectively (the distance A being 73, 58 and 78 mm. respectively). The feed pressures of the hydrocyclones 40d and 60d were maintained at 0.6 atm. gauge pressure, that of the hydrocyclones 50d at 0.5 atm. gauge pressure.

The overflow fraction of the hydrocyclones 60d yielded a coal with an ash content of 14.3%, the apex fraction of the hydrocyclones 50d giving shale having an ash content of 72.8%. The ash content of the feed amounted to 22.6%, 0.6 tons of coal sludge were treated per hour.

The comparatively high ash content of the coal is chiefly due to the fact that in this semi-technical installation the finest fraction with a grain-size $<75\mu$ is separated badly. If the coal sludge is subjected to preliminary classification, so that nearly all said very fine particles are absent, the following result is obtained:

| | Percent |
|---|---|
| Ash content of the feed | 16.8 |
| Ash content of the coal fraction | 6.2 |
| Ash content of the shale fraction | 72.1 |

*Example 13*

The following technical test may serve for comparing the results of the washing of coal sludge by the method according to the invention with the results of a flotation process. In the flotation of coal sludge $<1$ mm., coarser particles that happen to be present—for instance as a result of the occurrence of holes in the screens—are not or hardly caught. They remain contained in the shale fraction. If hydrocyclones are used, these difficulties will not arise. For an installation having a capacity of 10 t./h. of coal, for instance, 5 flotation machines according to Kleinbentink and a feed pump were needed. The energy required amounted to 30 H. P., while a quantity of 15 kg. of tar oil was used per hour. The resulting coal had an ash content of 12.3%, the shale fraction having an ash content of 68.6%.

The total yield of coal amounted to 81.2% of the initial product.

For washing an equal amount of coal sludge of the same composition by the method according to the invention use was made of an installation as shown in the diagram of Figure 7. In the first stage (hydrocyclones 60) a group of 60 hydrocyclones arranged parallel was applied, said hydrocyclones having the following dimensions:

| | |
|---|---|
| Diameter of the vortex chamber _____ mm__ | 60 |
| Diameter of the feed aperture _____ mm__ | 14 |
| Diameter of the vortex finder _____ mm__ | 25 |
| Length of the cylindrical section _____ mm__ | 40 |
| Length of the vortex finder _____ mm__ | 25 |
| Distance A _____ mm__ | 38 |
| Half apex angle _____ degrees__ | 37½ |

The feed pressure was maintained at 0.7 atm. gauge pressure. The apex fraction of the hydrocyclones 60 was subjected to a secondary treatment in a group of 35 hydrocyclones, arranged parallel, 50. The dimensions of these cyclones were equal to those of the cyclones of the first group, but the vortex finder had a length of 40 mm. (distance A 23 mm.). The feed pressure had been adjusted to 0.6 atm. gauge pressure. All of the overflow fraction from this second group was recycled.

For working the apparatus two pumps 63 and 53, having a total energy consumption of 6 H. P. were used. In this way a coal with an ash content of 12.5% and a shale fraction with an ash content of 73.5% could be obtained. The total yield of the coal fraction amounted to 84% of the original mixture.

The terminology employed in the specification is for the purpose of description and not of limitation, the scope of the invention being indicated in the claims.

We claim:

1. A continued process of separating into two fractions a liquid suspension having particles diverse both as to size and specific gravity, which comprises the steps of establishing and maintaining a rotating body of such suspension in a confined generally conical space having axial discharge outlets at its ends, continuously supplying such suspension tangentially and under pressure to the rotating body in the region of the base of the conical space together with a liquid separating medium of specific gravity substantially lower than a predetermined specific gravity of separation, and maintaining the major portion of the length of the envelope of the rotating body within an included angle of at least 50° and not exceeding 90°, the feed pressure of said suspension and separating medium being effective to maintain a cylindrical air column between said outlets, discharging from the base end of said space a fraction containing separating medium and suspended particles of a specific gravity less than the specific gravity of separation, and discharging from the apex end of said space into the open air a fraction containing separating medium and suspended particles of a specific gravity higher than the predetermined specific gravity of separation, the specific gravity of the medium discharged from the apex end of said space being less than the specific gravity of separation and less than the specific gravity of suspended particles discharged from the base end of said space.

2. A process of the character described in claim 1, wherein the separating medium is water, and the specific gravity of the particles is higher than 1.0.

3. A process of the character described in claim 1, including the step of controlling the specific gravity of separation by varying the axial position of the base end discharge outlet.

4. A process of the character described in claim 1, including the step of controlling the specific gravity of separation by varying the size of the apex outlet.

5. A process of the character described in claim 1, including the step of controlling the specific gravity of separation by varying the pressure operative against the base end discharge outlet.

6. A process of the character described in claim 1, wherein the diameter of the heavy fraction stream discharged from the apex end of said space does not exceed 0.7 times the diameter of the light fraction stream discharged from the base end of said space.

References Cited in the file of this patent

UNITED STATES PATENTS

| | | |
|---|---|---|
| 940,076 | Seaver _____ | Nov. 16, 1909 |
| 1,669,820 | Grant _____ | May 15, 1928 |
| 2,550,341 | Fontein _____ | Apr. 24, 1951 |
| 2,693,878 | Driessen et al. _____ | Nov. 9, 1954 |

UNITED STATES PATENT OFFICE
CERTIFICATE OF CORRECTION

Patent No. 2,819,795    January 14, 1958

Freerk J. Fontein et al.

It is hereby certified that error appears in the printed specification of the above numbered patent requiring correction and that the said Letters Patent should read as corrected below.

Column 4, lines 5 and 19, for "time", each occurrence, read -- times --; column 7, line 4, for "phenemon" read -- phenomenon --; column 19, line 56, for "56" read -- 66 --; column 21, line 32, for "continued" read -- continuous --.

Signed and sealed this 15th day of July 1958.

(SEAL)
Attest:
KARL H. AXLINE
Attesting Officer

ROBERT C. WATSON
Commissioner of Patents